US012551882B2

(12) United States Patent
Arai et al.

(10) Patent No.: US 12,551,882 B2
(45) Date of Patent: Feb. 17, 2026

(54) DROPLET DISCHARGE DEVICE

(71) Applicants: Daisuke Arai, Tokyo (JP); Takahiko Matsumoto, Kanagawa (JP); Yusuke Nonoyama, Kanagawa (JP); Takeshi Akai, Kanagawa (JP)

(72) Inventors: Daisuke Arai, Tokyo (JP); Takahiko Matsumoto, Kanagawa (JP); Yusuke Nonoyama, Kanagawa (JP); Takeshi Akai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 570 days.

(21) Appl. No.: 18/146,621

(22) Filed: Dec. 27, 2022

(65) Prior Publication Data

US 2023/0211335 A1 Jul. 6, 2023

(30) Foreign Application Priority Data

Jan. 4, 2022 (JP) ................................ 2022-000230

(51) Int. Cl.
*B01L 3/02* (2006.01)
*B01L 3/00* (2006.01)

(52) U.S. Cl.
CPC ......... *B01L 3/0268* (2013.01); *B01L 3/50853* (2013.01); *B01L 2200/023* (2013.01); *B01L 2200/143* (2013.01)

(58) Field of Classification Search
CPC .......................... B01L 3/0268; B01L 2200/10
See application file for complete search history.

(56) References Cited

U.S. PATENT DOCUMENTS

2004/0219689 A1 11/2004 Soma
2012/0298036 A1* 11/2012 Ogawa ....................... B41J 3/28 118/712
2020/0025784 A1 1/2020 Fujii et al.
2022/0274405 A1 9/2022 Midorikawa et al.

FOREIGN PATENT DOCUMENTS

| | | |
|---|---|---|
| JP | H05-240869 | 9/1993 |
| JP | H06-324054 | 11/1994 |
| JP | 2004-321932 | 11/2004 |
| JP | 2005-138013 | 6/2005 |
| JP | 2011-167815 | 9/2011 |
| JP | 2018-088522 | 6/2018 |
| JP | 2021-084421 | 6/2021 |
| JP | 2021-137792 | 9/2021 |

* cited by examiner

*Primary Examiner* — Natalia Levkovich
(74) *Attorney, Agent, or Firm* — IPUSA, PLLC

(57) ABSTRACT

A droplet discharge device for discharging a droplet into one or more droplet storage parts of a storage vessel; the droplet discharge device including:
- a droplet discharge part configured to discharge the droplet in a predetermined amount from a nozzle hole of the droplet discharge part;
- a storage vessel holding part configured to hold the storage vessel;
- a mover part configured to move the droplet discharge part relative to the storage vessel that is held by the storage vessel holding part; and
- a detecting part configured to detect a shape of a surface of the storage vessel that is held by the storage vessel holding part.

7 Claims, 7 Drawing Sheets

100

DROPLET DISCHARGE DEVICE

CROSS-REFERENCE TO RELATED APPLICATION

The present application is based on and claims priority under 35 U.S.C. § 119 to Japanese Patent Application No. 2022-000230, filed on Jan. 4, 2022, the contents of which are incorporated herein by reference in their entirety.

BACKGROUND OF THE INVENTION

1. Field of the Invention

The present disclosure relates to a droplet discharge device.

2. Description of the Related Art

Japanese Unexamined Patent Application Publication No. 2021-137792 discloses a technique for discharging droplets from nozzle holes with membrane nozzle holes situated inside a well for the purpose of accurately placing the droplets in the well that is formed inside a well plate.

SUMMARY OF THE INVENTION

According to one aspect of the present invention, there is provided a droplet discharge device for discharging a droplet into one or more droplet storage parts of a storage vessel; the droplet discharge device including a droplet discharge part configured to discharge the droplet in a predetermined amount from a nozzle hole of the droplet discharge part; a storage vessel holding part configured to hold the storage vessel; a mover part configured to move the droplet discharge part relative to the storage vessel that is held by the storage vessel holding part; and a detecting part configured to detect a shape of a surface of the storage vessel that is held by the storage vessel holding part.

DESCRIPTION OF THE EMBODIMENTS

To solve the problem of the conventional technology described above, it is an objective of the present disclosure to accurately place droplets into droplet storage parts formed in a storage vessel while substantially preventing a droplet discharge part that discharges the droplets from colliding with the storage vessel.

The droplet discharge device according to one embodiment can accurately place droplets into the droplet storage parts formed in the storage vessel while substantially preventing the droplet discharge part that discharges the droplets from colliding with the storage vessel.

Embodiments will be described below with reference to the drawings.

First Embodiment (Example of Configuration of Droplet Discharge Device 100)

Figure 1:
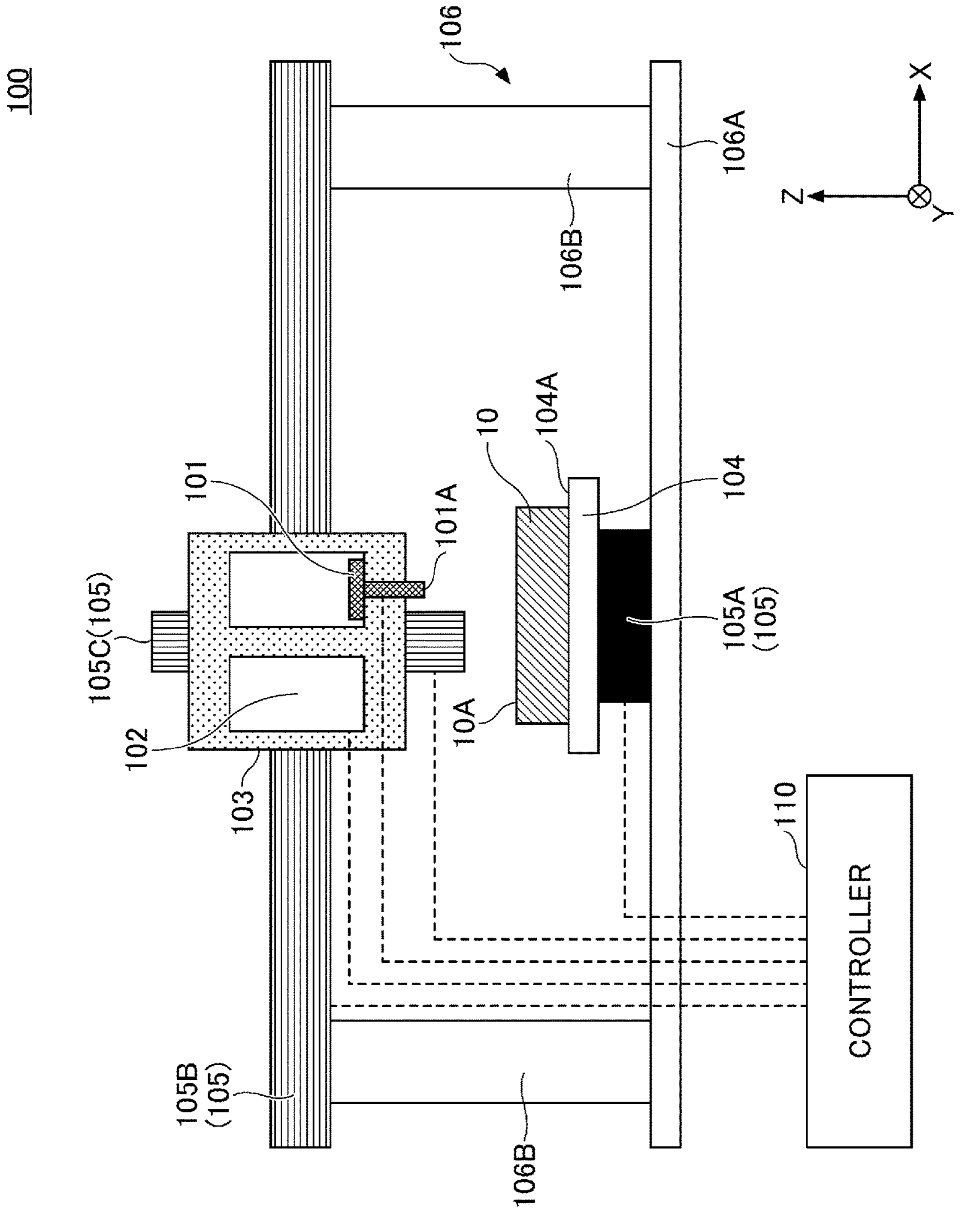
FIG. 1 is diagram illustrating an example of the configuration of a droplet discharge device according to the first embodiment.

FIG. 1 is a diagram illustrating an example of the configuration of a droplet discharge device 100 according to the first embodiment. The droplet discharge device 100 illustrated in FIG. 1 is a device capable of discharging droplets from a nozzle hole 101A at the tip of a droplet discharge part 101 with the tip of the droplet discharge part 101 situated inside a droplet storage part 11 that has a recessed shape and is formed on the surface 10A of a storage vessel 10. Therefore, the droplet discharge device 100 can enhance the placement accuracy of the droplets inside the droplet storage part 11 in comparison with the case of discharging the droplets from above the droplet storage part 11.

The droplet discharge device 100 can be used, for example, as a bio-printer. In such a case, the droplet discharge device 100 can discharge the cell-containing liquid (an example of the "droplet") into the well (an example of the "storage vessel") of the well plate (an example of the "droplet storage part").

As illustrated in FIG. 1, the droplet discharge device 100 includes a droplet discharge part 101, a detecting part 102, a holding part 103, a storage vessel holding part 104, a mover part 105, a frame 106, and a controller 110.

The droplet discharge part 101 has the nozzle hole 101A at the tip (lower end), and can discharge (in the negative Z-axis direction) a droplet in the predetermined amount from the nozzle hole 101A. An inkjet head, for example, is used as the droplet discharge part 101.

For example, in the case where an inkjet head is used as the droplet discharge part 101, the droplet discharge part 101 is configured with a liquid chamber, a nozzle hole 101A, an injection port, and an actuator (For example, a piezo element). In such a case, with the droplet discharge part 101, a retention vessel for retaining the liquid is pressurized by a pressurizing component, and the liquid is supplied from the retention vessel into the liquid chamber through the injection inlet. Further, with the droplet discharge part 101, a voltage is applied to the actuator and the liquid in the liquid chamber is pressurized by the actuator, so that a droplet in the predetermined amount is discharged from the liquid chamber through the nozzle hole 101A.

The detecting part 102 detects the shape of the storage vessel 10 held by the storage vessel holding part 104. In this embodiment, the detecting part 102 is a ranging sensor that uses that infrared rays or the like to detect the distance from the detecting part 102 to the surface 10A of the storage vessel 10 held by the storage vessel holding part 104. Examples of the ranging sensor include a laser sensor, a time-of-flight (TOF) sensor, an ultrasonic sensor, a millimeter-wave radar or the like.

The holding part 103 holds the droplet discharge part 101 and the detecting part 102. The holding part 103 is provided such that the holding part 103 is movable in the horizontal direction (X-axis direction) and the vertical direction (Z-axis direction) by the mover part 105 (first horizontal mover part 105B and vertical mover part 105C). By moving the holding part 103 in the horizontal direction, the droplet discharge part 101 and the detecting part 102 can be moved in the horizontal direction. In the droplet discharge device 100 according to the first embodiment, the holding of the droplet discharge part 101 and the detecting part 102 by the holding part 103, causes the droplet discharge part 101 and the detecting part 102 to be moved integrally and at the same time in the horizontal direction, and thus the droplet discharge device 100 can be made more compact and costs can be reduced.

The storage vessel holding part 104 holds the storage vessel 10. For example, in the example illustrated in FIG. 1, the storage vessel holding part 104 has a mounting surface 104A that is horizontal and flat shaped. This storage vessel holding part 104 can hold the storage vessel 10 mounted on the mounting surface 104A. The storage vessel holding part 104 is provided such that the storage vessel holding part 104 is movable in the horizontal direction (Y-axis direction) by the mover part 105 (second horizontal mover part 105A).

The mover part 105 can move the droplet discharge part 101 and the detecting part 102 that are held by the holding part 103 by moving the holding part 103 relative to the storage vessel 10 that is held by the storage vessel holding part 104. Here, the expression "moving . . . relative to" includes relative movement in the horizontal direction (including the X-axis and Y-axis directions) and relative movement in the vertical direction (Z-axis direction). These relative moving components may exist independently for each relative movement in each axial direction, or one moving component may control the relative movement in multiple axial directions. The mover part 105 has a vertical mover part 105C, a first horizontal mover part 105B, and a second horizontal mover part 105A. The vertical mover part 105C can move the holding part 103 in the vertical direction (Z-axis direction). The first horizontal mover part 105B can move the holding part 103 in the left-and-right direction (X-axis direction). The second horizontal mover part 105A can move the storage vessel holding part 104 in the forward-and-rearward direction (Y-axis direction).

A frame 106 supports each component. In the example illustrated in FIG. 1, the frame 106 is configured with a horizontal plate-shaped substrate 106A and multiple supports 106B vertically erected on the top surface of the substrate 106A. The storage vessel holding part 104 and the second horizontal mover part 105A are installed at the center of the top surface of the substrate 106A. The multiple supports 106B support the left and right ends of the first horizontal mover part 105B at a predetermined height position.

The controller 110 controls the discharge of droplets performed by the droplet discharge part 101, the horizontal (X-axis direction) movement and vertical (Z-axis direction) movement of the holding part 103 that are performed by the mover part 105, the horizontal (Y-axis direction) movement of the storage vessel holding part 104 that is performed by the mover part 105, and the detection of the shape of the storage vessel 10 that is performed by the detecting part 102.

(Example of configuration of storage vessel 10)

Figure 2A:
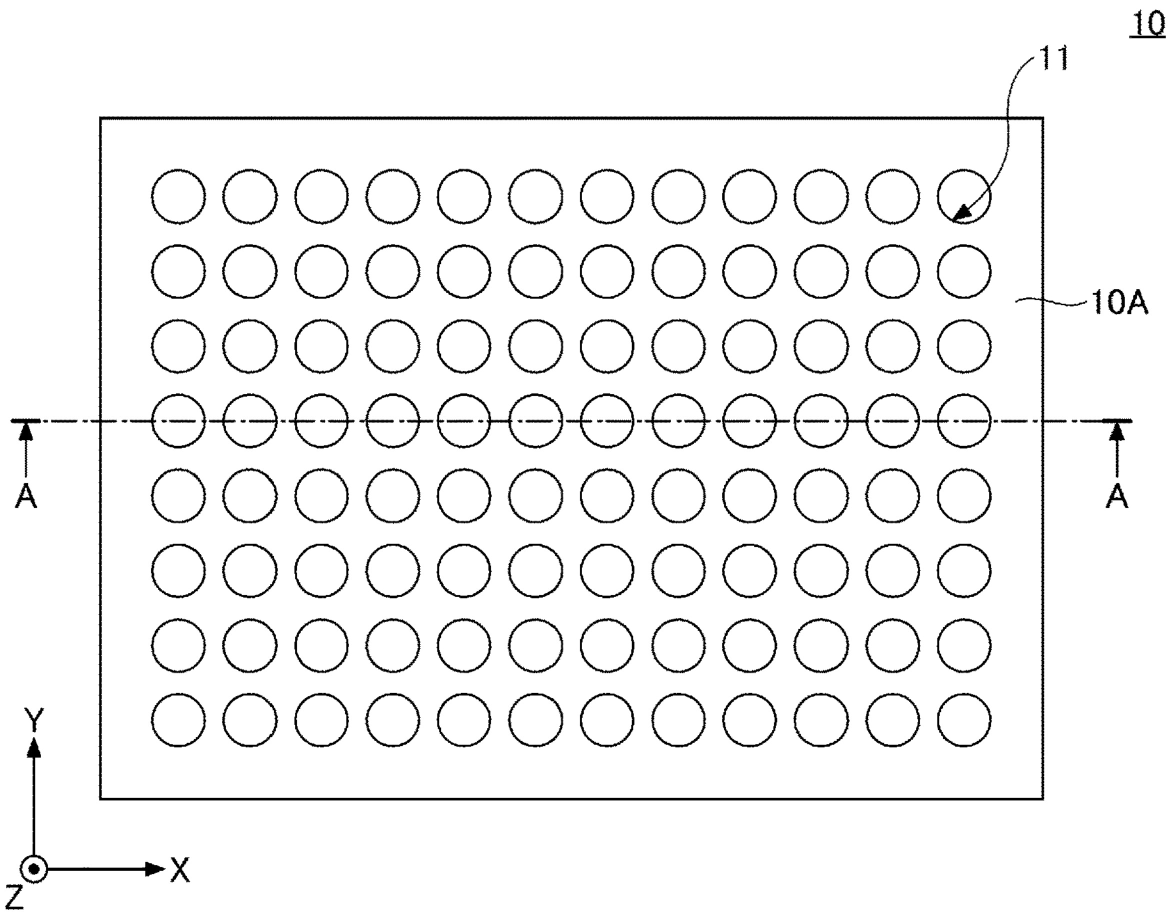
FIG. 2A and FIG. 2B are diagrams illustrating an example of the configuration of a storage vessel used with the droplet discharge device according to the first embodiment.
Figure 2B:
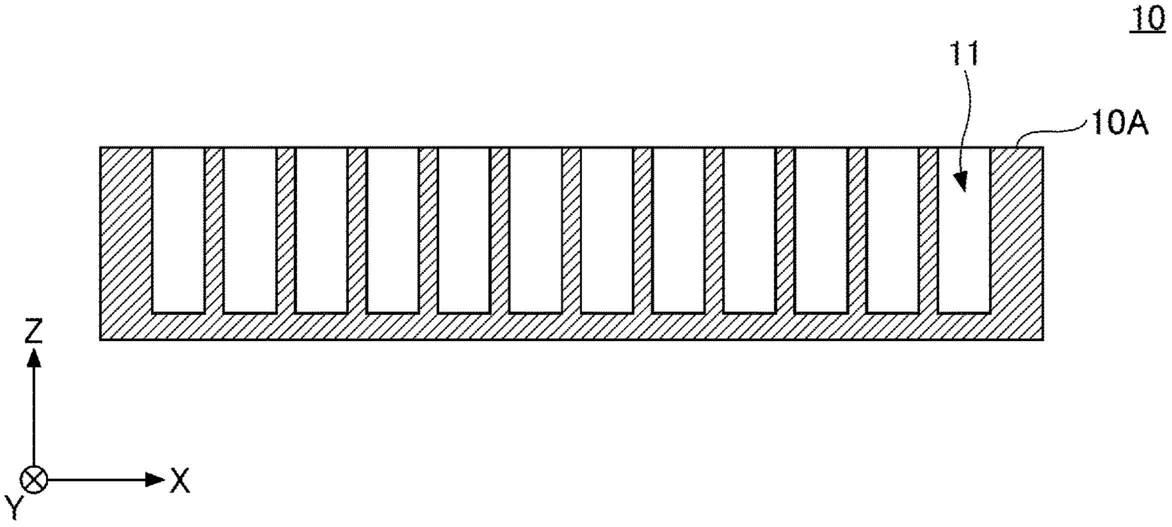

FIG. 2A and FIG. 2B are diagrams illustrating an example of the configuration of the storage vessel 10 used with the droplet discharge device 100 according to the first embodiment. FIG. 2A is a top view of the storage vessel 10. FIG. 2B is an A-A cross-sectional view of the storage vessel 10.

As illustrated in FIG. 2, multiple droplet storage parts 11 are formed in the surface 10A of the storage vessel 10. In the example illustrated in FIG. 2A, in the surface 10A of the storage vessel 10, multiple droplet storage parts 11 are formed in a matrix shape with multiple rows in the X-axis direction and multiple rows in the Y-axis direction. In the example illustrated in FIG. 2A and FIG. 2B, each of the multiple droplet storage parts 11 has a recessed shape recessed downward (in the negative Z-axis direction) and a circular shape in a plan view.

Several types of storage vessels 10 are used for the droplet discharge device 100. The technical specifications of the storage vessels 10 (for example, the size of the storage vessel 10, the number of the droplet storage parts 11, the arrangement pattern, the shape, the size, and so on) are varied in accordance with the type of the storage vessel 10.

In the droplet discharge device 100 according to the first embodiment, the shape of the surface 10A of the storage vessel 10 can be measured (scanned) by continuously detecting the distance to the surface 10A of the storage vessel 10 performed by the detecting part 102 while moving the detecting part 102 in the horizontal direction (X-axis direction) and moving the storage vessel 10 in the forward-and-rearward direction (Y-axis direction) by the mover part 105. That is, the droplet discharge device 100 can determine each region of the multiple droplet storage parts 11 in the surface 10A of the storage vessel 10. However, the movement of the detecting part 102 is not limited to the above configuration as long as the detecting part 102 is moved relative to the storage vessel 10 in the X-axis and Y-axis directions. For example, either the detecting part 102 or the storage vessel 10 may move in the X and Y directions, or the detecting part 102 may move in the forward-and-rearward direction (Y-axis direction) and the storage vessel 10 may move in the horizontal direction (X-axis direction).

In the droplet discharge device 100 according to the first embodiment, the tip of the droplet discharge part 101 is inserted into each of the determined multiple droplet storage parts 11, and a droplet in the predetermined amount can be discharged from the tip of the droplet discharge part 101 into each of the droplet storage parts 11. Therefore, in the droplet discharge device 100 according to the first embodiment, the tip of the droplet discharge part 101 can be inserted into the droplet storage part 11 with high accuracy without causing the tip of the droplet discharge part 101 to come into contact with the surface 10A of the storage vessel 10.

Therefore, according to the droplet discharge device 100 according to the first embodiment, droplets can be discharged into each of the multiple droplet storage parts 11 with high accuracy, even in a case where multiple types of storage vessels 10 with different technical specifications are used, by measuring the shape of the surface 10A for each type of storage vessel 10.

(Functional Configuration of Controller 110)

Figure 3:
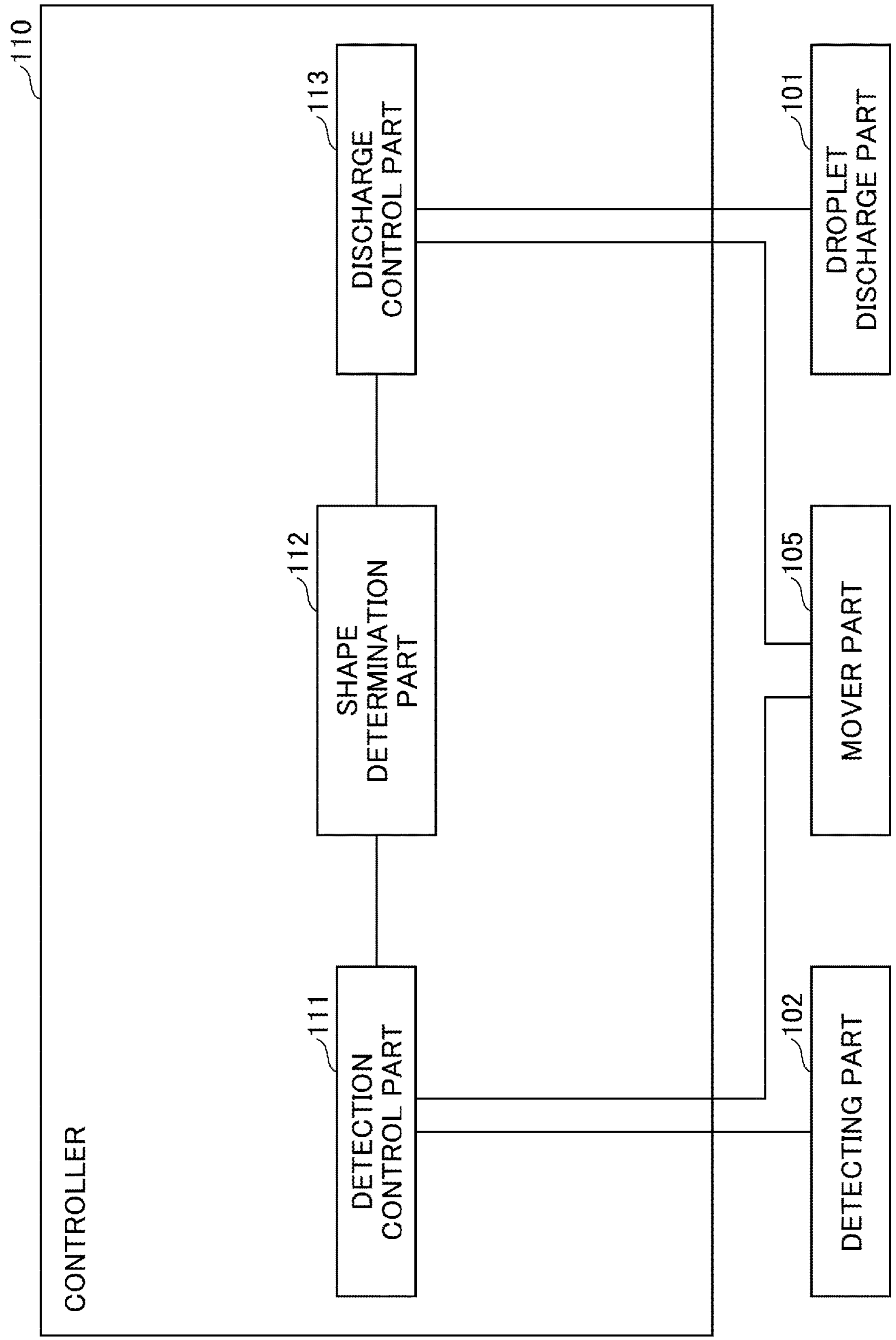
FIG. 3 is a diagram illustrating an example of the functional configuration of a controller provided in the droplet discharge device according to the first embodiment.

FIG. 3 is a diagram illustrating an example of the functional configuration of the controller 110 provided in the droplet discharge device 100 according to the first embodiment.

As illustrated in FIG. 3, the controller 110 includes a detection control part 111, a shape determination part 112, and a discharge control part 113.

The detection control part 111 controls the detection of the shape of the storage vessel 10 performed by the detecting part 102. For example, the detection control part 111 causes the detecting part 102 to continuously detect the distance to the surface 10A of the storage vessel 10 while moving the holding part 103 in the horizontal direction (X-axis direction) and moving the storage vessel holding part 104 in the horizontal direction (Y-axis direction). Each time the detecting part 102 detects a distance, the detection control part 111 acquires distance data indicating the detected distance from the detecting part 102. That is, the detecting part 102 continuously acquires multiple pieces of distance data for the respective positions on the surface 10A of the storage vessel 10 in accordance with the multiple pieces of distance data being continuously output by the detection control part 111.

The shape determination part 112 determines the shape of the surface 10A of the storage vessel 10 based on the multiple pieces of distance data acquired by the detection control part 111.

For example, the shape determination part 112 can determine a region on the surface 10A of the storage vessel 10 where the detected distance remains constant at a first distance Ha as a region where the droplet storage part 11 is not formed.

Also, the shape determination part 112 can determine the region in the surface 10A of the storage vessel 10 where the detected distance is a second distance Hb that is greater than the first distance Ha as the region where the droplet storage part 11 is formed.

In this way, the shape determination part 112 can determine the formation regions (i.e., position, shape, and size) of each of the multiple droplet storage parts 11 in the surface 10A of the storage vessel 10.

The discharge control part 113 controls the discharge of droplets by the droplet discharge part 101 based on the shape of the storage vessel 10 determined by the shape determination part 112.

For example, the discharge control part 113 causes the droplet discharge part 101 to discharge a droplet for each of the multiple droplet storage parts 11 whose formation region is identified by the shape determination part 112.

Specifically, the discharge control part 113 controls the horizontal (X-axis direction) movement of the holding part 103 performed and the horizontal (Y-axis direction) movement of the storage vessel holding part 104 that are performed by the mover part 105 to move the tip of the droplet discharge part 101 over the formation region of the droplet storage part 11.

The discharge control part 113 controls the vertical (Z-axis direction) movement of the holding part 103 performed by the mover part 105 to insert the tip of the droplet discharge part 101 into the droplet storage part 11.

Furthermore, the discharge control part 113 discharges a droplet in the predetermined amount from a nozzle hole 101A at the tip of the droplet discharge part 101 with the tip of the droplet discharge part 101 inserted into the droplet storage part 11. By performing this control for each of the multiple droplet storage parts 11, the discharge control part 113 can place droplets into each of the multiple droplet storage parts 11 with high accuracy.

Each function of the controller 110 may be implemented by one or more processing circuits. The term "processing circuit" as used herein includes a processor programmed to execute each function by software, such as a processor implemented in an electronic circuit, or devices such as an Application Specific Integrated Circuit (ASIC), a digital signal processor (DSP), a field programmable gate arrays (FPGA), and a conventional circuit module, designed to execute each function described above.

(Example of processing procedure by controller 110)

Figure 4:
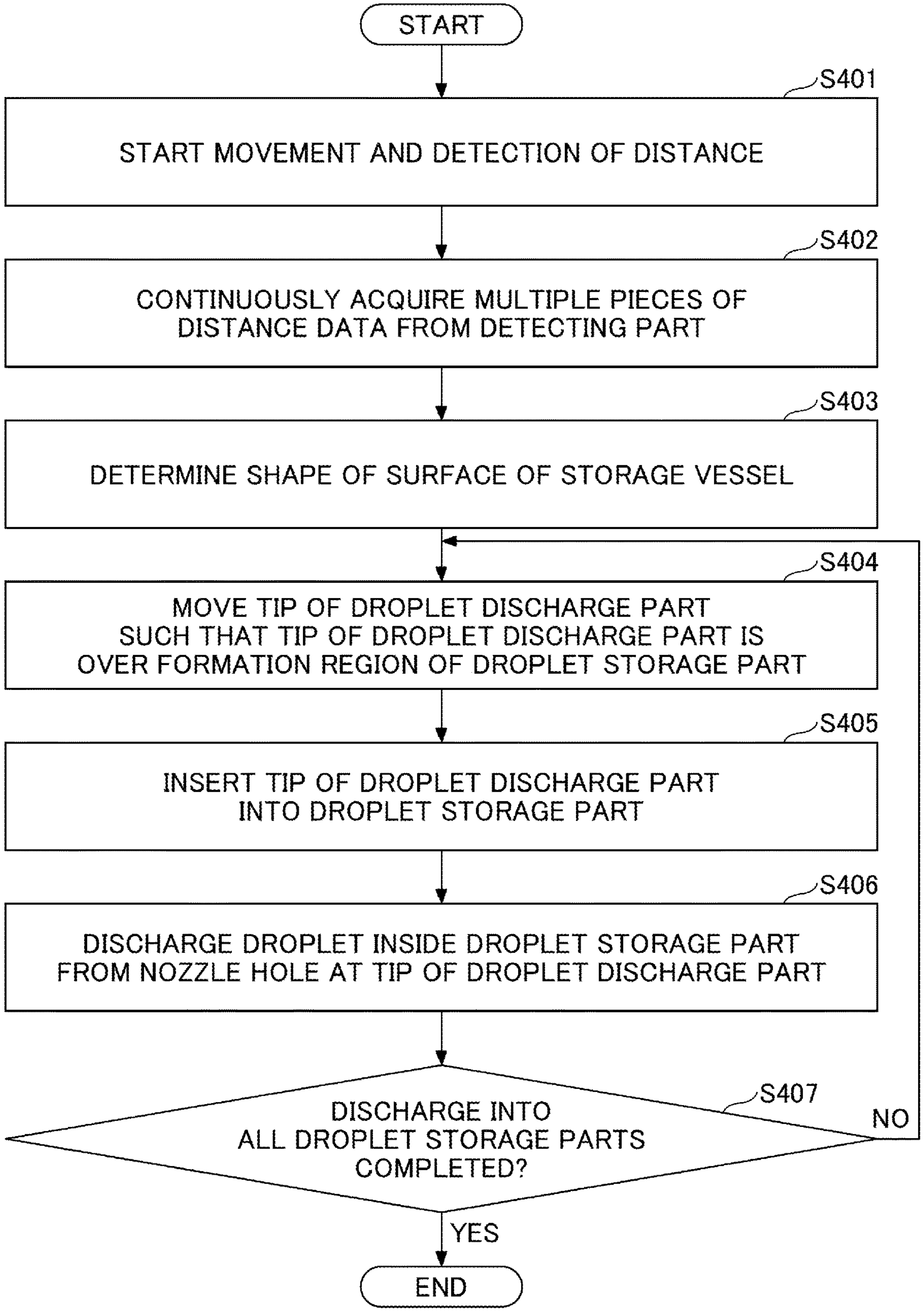
FIG. 4 is a flowchart illustrating an example of the procedure of processing performed by the controller provided in the droplet discharge device according to the first embodiment.

FIG. 4 is a flowchart illustrating an example of the processing procedure that is performed by the controller 110 provided in the droplet discharge device 100 according to the first embodiment.

First, the detection control part 111 starts moving the holding part 103 in the horizontal direction (X-axis direction) and moving the storage vessel holding part 104 in the horizontal direction (Y-axis direction), and causes the detecting part 102 to start continuous detection of the distance to the surface 10A of the storage vessel 10 (step S401).

Then, the detection control part 111 continuously acquires multiple pieces of distance data for the respective positions on the surface 10A of the storage vessel 10 in accordance with the multiple pieces of distance data being continuously output by the detecting part 102 (step S402).

Next, the shape determination part 112 determines the shape of the surface 10A of the storage vessel 10 based on the multiple pieces of distance data acquired in step S402 (step S403). The results of this determination include the formation regions (position, shape, size, and so on) of each of the multiple droplet storage parts 11 in the surface 10A of the storage vessel 10.

Next, the discharge control part 113 controls the horizontal (X-axis direction) movement of the holding part 103 performed by the mover part 105 and the horizontal (Y-axis direction) movement of the storage vessel holding part 104 performed by the mover part 105 to move the tip of the droplet discharge part 101 over the formation region of the droplet storage part 11 determined in step S403 (step S404). At this time, the discharge control part 113 ensures that the tip of the droplet discharge part 101 is completely within the area of the formation region of the droplet storage part 11 so that the tip of the droplet discharge part 101 does not come into contact with the surface 10A of the storage vessel 10.

Next, the discharge control part 113 controls the vertical (Z-axis direction) movement of the holding part 103 performed by the mover part 105 such that the tip of the droplet discharge part 101 is inserted into the droplet storage part 11 (step S405).

Next, the discharge control part 113 discharges a droplet in the predetermined amount from the nozzle hole 101A at the tip of the droplet discharge part 101 with the tip of the droplet discharge part 101 inserted into the droplet storage part 11 (step S406).

Next, the discharge control part 113 determines whether or not the discharge of droplets into all the droplet storage parts 11 has been completed (step S407).

If the discharge control part 113 determined in step S407 that the discharge of droplets to all the droplet storage parts 11 has not been completed (NO in step S407), the controller 110 returns processing to step S404.

Conversely, if discharge control part 113 determined in step S407 that the discharge of droplets into all the droplet storage parts 11 has been completed (YES in step S407), the controller 110 ends the series of processing illustrated in FIG. 4.

In the droplet discharge device 100 according to the first embodiment, by executing the series of processing illustrated in FIG. 4, the droplets can be placed into each of the multiple droplet storage parts 11 with high accuracy without causing the tip of the droplet discharge part 101 to come into contact with the surface 10A of the storage vessel 10.

(Example of Distance Detection by Droplet Discharge Device 100)

Figure 5A:
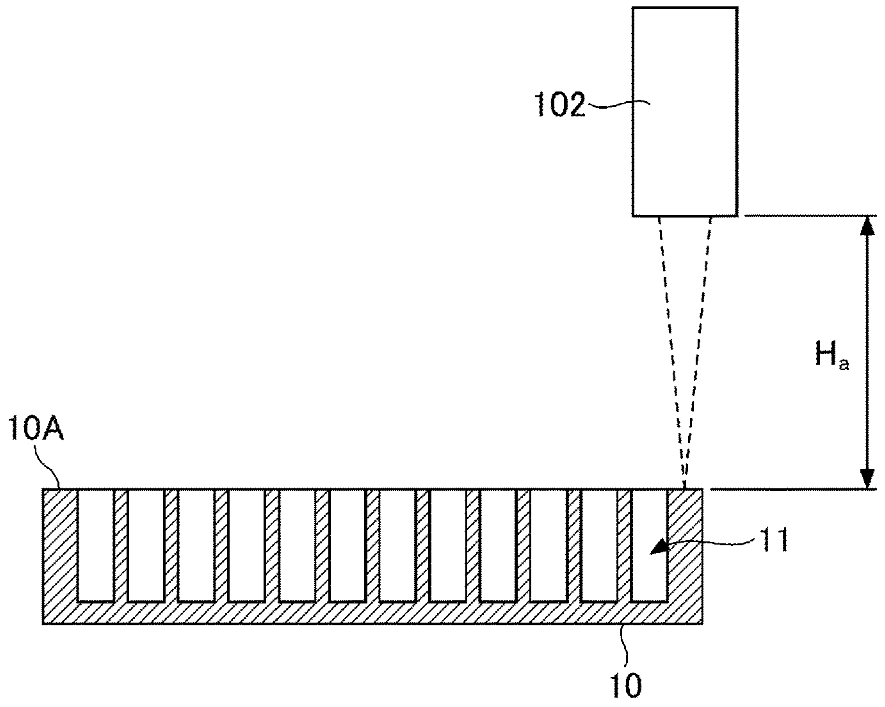
FIG. 5A and FIG. 5B are diagrams illustrating an example of distance detection performed by the droplet discharge device according to the first embodiment.
Figure 5B:
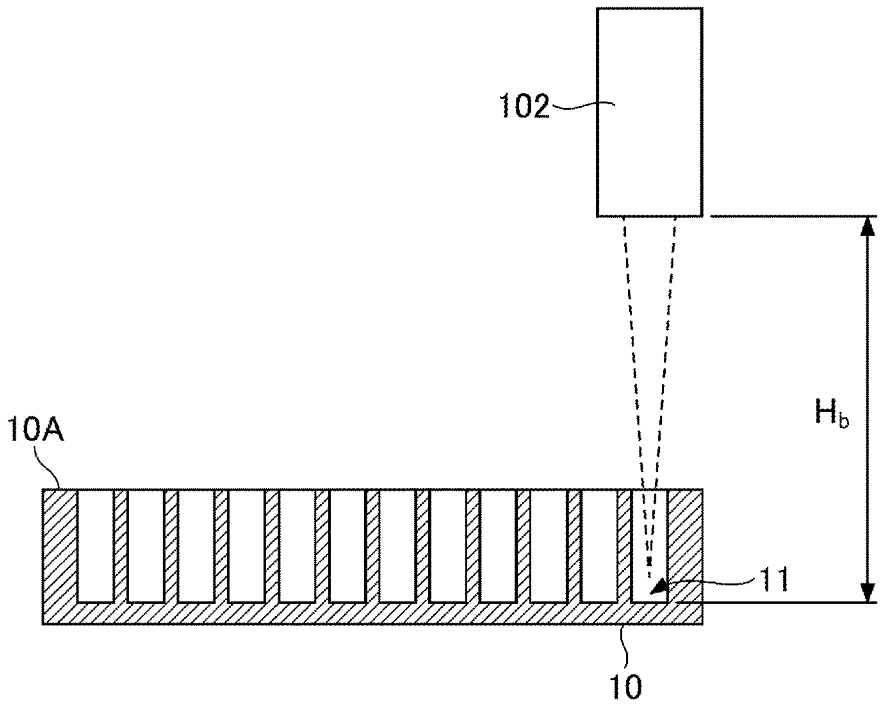
Figure 6:
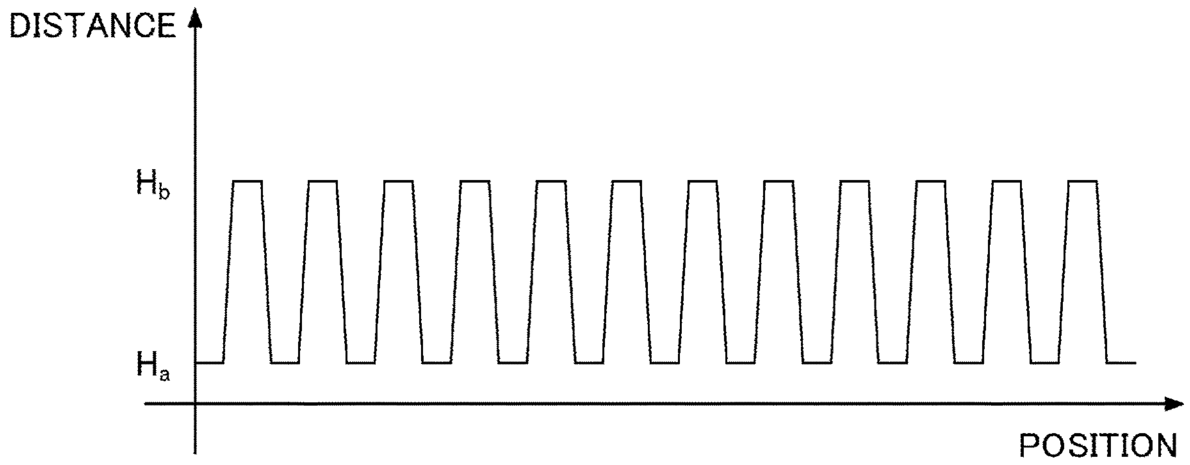
FIG. 6 is a diagram illustrating an example of shape data generated by the droplet discharge device according to the first embodiment.

FIG. 5A and FIG. 5B are diagrams illustrating an example of distance detection by the droplet discharge device 100 according to the first embodiment. FIG. 6 is a diagram illustrating an example of the shape data generated by the droplet discharge device 100 according to the first embodiment.

As illustrated in FIG. 5A, in the droplet discharge device 100 according to the first embodiment, the first distance Ha is detected in a case where the detecting part 102 detects a distance to the region where the droplet storage part 11 is not formed in the surface 10A of the storage vessel 10.

Conversely, as illustrated in FIG. 5B, in the droplet discharge device 100 according to the first embodiment, the second distance Hb, being a distance greater than the first distance Ha by the depth of the droplet storage part 11, is detected in a case where the detecting part 102 detects a distance to the region where the droplet storage part 11 is formed in the surface 10A of the storage vessel 10.

Therefore, by detecting the distance to the surface 10A of the storage vessel 10 by the detecting part 102 while moving the detecting part 102 horizontally, the droplet discharge device 100 according to the first embodiment can generate shape data (shape data indicating the relationship between position and distance) of the surface 10A of the storage vessel 10, where the distance at the position where the droplet storage part 11 is not formed is the first distance Ha and the distance at the position where the droplet storage part 11 is formed is the second distance Hb, as illustrated in FIG. 6.

At that time, the droplet discharge device 100 according to the first embodiment can detect the overall shape of the surface 10A of the storage vessel 10 by moving the detecting part 102 in the horizontal direction (X-axis direction) and moving the storage vessel holding part 104 in the horizontal direction (Y-axis direction) such that the entire surface 10A of the storage vessel 10 is scanned.

With the droplet discharge device 100 according to the first embodiment, by inserting the tip of the droplet discharge part 101 into the droplet storage part 11 based on the shape data, the tip of the droplet discharge part 101 can be inserted into the droplet storage part 11 with high accuracy without causing the tip of the droplet discharge part 101 to come into contact with the surface 10A of the storage vessel 10.

Second Embodiment

Changes to the droplet discharge device 100 according to the second embodiment from the droplet discharge device 100 according to the first embodiment will be described below.

(Functional Configuration of Controller 110)

Figure 7:
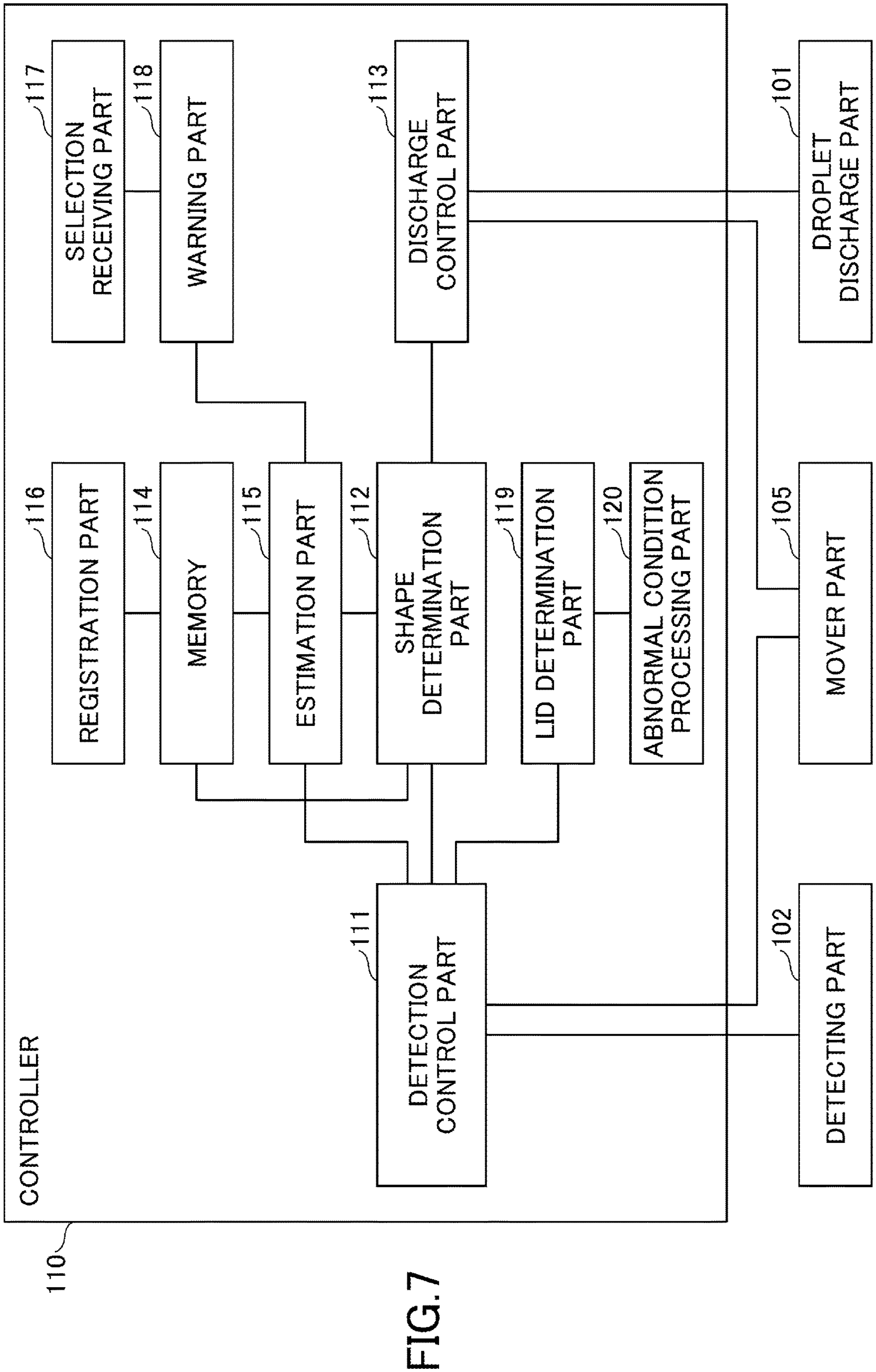
FIG. 7 is a diagram illustrating an example of the functional configuration of a controller provided in a droplet discharge device according to the second embodiment.

FIG. 7 is a diagram illustrating an example of the functional configuration of the controller 110 provided in the droplet discharge device 100 according to the second embodiment.

As illustrated in FIG. 7, the controller 110 according to the second embodiment further includes a memory 114, an estimation part 115, a registration part 116, a selection receiving part 117, a warning part 118, a lid determination part 119, and an abnormal condition processing part 120.

The memory 114 stores shape data for each of the multiple types of storage vessels 10.

The estimation part 115 estimates the type of storage vessel 10 held by the storage vessel holding part 104 by comparing a shape of a portion of the surface 10A of the storage vessel 10 detected by the detecting part 102 against the multiple pieces of shape data stored in the memory 114.

For example, the estimation part 115 estimates the type of the storage vessel 10 based the size of the storage vessel 10, the number of droplet storage parts 11, the shape of the droplet storage parts 11, the size of the droplet storage parts 11, the formation interval between the droplet storage parts 11, or any combination thereof.

In the droplet discharge device 100 according to the second embodiment, the shape determination part 112 can determine the overall shape of the surface 10A of the storage vessel 10 by acquiring the shape data of the storage vessel 10 estimated by the estimation part 115 from the memory 114.

Thus, the droplet discharge device 100 according to the second embodiment can estimate the type of the storage vessel 10 held by the storage vessel holding part 104 based on the detection result of the shape of the portion of the surface 10A of the storage vessel 10 without measuring the overall shape of the surface 10A of the storage vessel 10, and can determine the overall shape of the surface 10A of the storage vessel 10. Therefore, the controller 110 according to the second embodiment can be downsized and costs can be reduced owing to both the reduced measurement time and simplified configuration.

The registration part 116 registers the input shape data of the storage vessel 10 in the memory 114. By doing so, even in the case where a storage vessel 10 for which shape data is not recorded in the memory 114 is being used for the first time, the droplet discharge device 100 according to the second embodiment can estimate the storage vessel 10 by the estimation part 115 by registering the shape data of the storage vessel 10 in the memory 114.

The selection receiving part 117 receives, from the user, the selection of the type of storage vessel 10 to be used. For example, the selection receiving part 117 displays the types of the multiple storage vessels 10 stored in the memory on the display and allows the user to select one of the storage vessels 10 from the multiple types of storage vessels 10.

The warning part 118 issues a warning in a case where the type of selected storage vessel 10 differs from the type of storage vessel 10 estimated by the estimation part 115.

Thus, when the user makes a selection error with respect to the type of the storage vessel 10, the droplet discharge device 100 according to the second embodiment can notify the user of the selection error and thus can substantially prevent discharging of droplets caused by incorrect shape data.

The lid determination part 119 determines whether or not a lid is attached to the storage vessel 10 based on a result of a detection performed by the detecting part 102 regarding the shape of the surface 10A of the storage vessel 10. For example, the lid determination part 119 determines that a lid is attached to the storage vessel 10 in a case where the detecting part 102 did not detect the droplet storage part 11 or in a case where the number of detections of the droplet storage parts 11 detected by the detecting part 102 was insufficient.

In the case where the lid determination part 119 determines that a lid is attached to the storage vessel 10, the abnormal condition processing part 120 issues a warning and controls the droplet discharge part 101 such that the droplet discharge part 101 does not discharge any droplets.

Thus, in the case where the lid is attached to the storage vessel 10, the droplet discharge device 100 according to the second embodiment can notify the user of the attachment of the lid, and can substantially prevent erroneous discharging of droplets to the storage vessel 10 to which the lid is attached.

Although the preferred embodiment of the present disclosure has been described in detail above, the present invention is not limited to the embodiment described above. Various changes and modifications can be applied without departing from the scope of the present disclosure defined in the appended claims.

For example, the detecting part 102 may be an image-capturing device (For example, a stereo camera) that captures an image of the surface 10A of the storage vessel 10. In such a case, since the entire surface 10A of the storage vessel 10 can be image-captured at once, it is not necessary to perform image-capturing while moving the detecting part 102.

In the present disclosure, the "mover part that moves the droplet discharge part relative to the storage vessel held by the storage vessel holding part" can be expressed as "a mover part that moves the droplet discharge part relative to the storage vessel held by the storage vessel holding part in the horizontal and vertical directions" or separately as "a horizontal mover part that moves the droplet discharge relative to the storage vessel held by the storage vessel holding part in the horizontal direction, and a vertical mover part that moves the droplet discharge relative to the storage vessel held by the storage vessel holding part in the vertical direction". In such a case, the first horizontal mover part 105B and the second horizontal mover part 105A of the embodiment correspond to the "horizontal mover part", and the vertical mover part 105C of the embodiment corresponds to the "vertical mover part". It can also be described as "The first horizontal mover part moves the droplet discharge part relative to the storage vessel held by the storage vessel holding part in the first horizontal direction, the second horizontal mover part moves the droplet discharge part relative to the storage vessel held by the storage vessel holding part in the second horizontal direction perpendicular to the first horizontal direction, and the vertical mover part moves the droplet discharge part relative to the storage vessel held by the storage vessel holding part in the vertical direction".

What is claimed is:

1. A droplet discharge device configured to discharge a droplet into each of one or more droplet storage parts of a storage vessel, the storage vessel being one of a plurality of types of storage vessels, the droplet discharge device comprising:

a droplet discharge part having a nozzle;

a storage vessel holding part having a mounting surface on which the storage vessel is mounted;

a detector configured to detect a shape of part of a surface of the storage vessel mounted on the mounting surface of the storage vessel holding part;

circuitry programmed to execute computer-executable instructions; and a non-transitory memory storing the computer-executable instructions, which cause the circuitry to execute:

storing data of the plurality of types of storage vessels;

discharging the droplet from the nozzle of the droplet discharge part to the storage vessel;

causing the detector to detect the shape of the part of the surface of the storage vessel; and estimating a type of the storage vessel by comparing the shape of the part of the surface of the storage vessel detected by the detector with the stored data of the plurality of types of storage vessels, wherein the circuitry is further programmed to execute estimating the type of the storage vessel based on a size of the storage vessel, a number of the one or more droplet storage parts, a shape of the one or more droplet storage parts, a size of the one or more droplet storage parts, an interval between the one or more droplet storage parts, or any combination thereof.

2. The droplet discharge device according to claim 1, wherein the circuitry is further programmed to execute registration of shape data input into the memory.

3. The droplet discharge device according to claim 1, wherein the circuitry is further programmed to execute:

receiving, from a user, a selection regarding a type of the storage vessel to be used; and issuing a warning in a case where the type of the selected storage vessel differs from the type of the estimated storage vessel.

4. The droplet discharge device according to claim 1, wherein the detector is a ranging sensor that is configured to perform contact-free detection regarding a distance to the surface of the storage vessel.

5. The droplet discharge device according to claim 1, wherein the detector is an image-capturing device that is configured to capture an image of the surface of the storage vessel.

6. The droplet discharge device according to claim 4, further comprising a holding part configured to integrally hold the droplet discharge part and the detector.

7. The droplet discharge device according to claim 1, wherein the circuitry is further programmed to execute:

determining as to whether or not a lid is attached to the storage vessel, based on a result of the detection of the shape of the part of the surface of the storage vessel performed by the detector;

issuing a warning and performing control such that the droplet is not discharged in a case where the lid is determined as being attached to the storage vessel.

* * * * *